United States Patent [19]

Ogita et al.

[11] Patent Number: 5,589,524
[45] Date of Patent: Dec. 31, 1996

[54] POLYPHENYLENE SULFIDE RESIN COMPOSITION AND LIGHT REFLECTIVE MOLDED ARTICLE

[75] Inventors: Yasuhisa Ogita; Toshikazu Kato, both of Mie, Japan

[73] Assignee: Tosoh, Corporation, Yamaguchi, Japan

[21] Appl. No.: 507,015

[22] Filed: Jul. 25, 1995

[30] Foreign Application Priority Data

Jul. 27, 1994 [JP] Japan .................... 6-175185

[51] Int. Cl.⁶ .................................... C08K 9/06
[52] U.S. Cl. ................. 523/212; 524/425; 524/449; 524/609
[58] Field of Search ..................... 524/425, 449, 524/609; 523/212

[56] References Cited

U.S. PATENT DOCUMENTS

| | | | |
|---|---|---|---|
| 4,365,037 | 12/1982 | Adachi et al. | 524/449 |
| 4,442,243 | 4/1984 | Woodhams | 523/212 |
| 4,487,879 | 12/1984 | Needham | 524/609 |
| 4,612,339 | 9/1986 | Giroud-Abel | 524/402 |
| 4,749,598 | 6/1988 | Miles | 524/425 |
| 5,013,823 | 5/1991 | Mizuno et al. | 524/609 |
| 5,177,137 | 1/1993 | Kawashima et al. | 524/425 |
| 5,179,145 | 1/1993 | Wright | 524/425 |
| 5,286,784 | 2/1994 | Inoue et al. | 524/609 |

FOREIGN PATENT DOCUMENTS

| | | |
|---|---|---|
| 0103869 | 3/1984 | European Pat. Off. . |
| 0374495 | 6/1990 | European Pat. Off. . |
| 60-189443 | 9/1985 | Japan . |
| 63-243162 | 10/1988 | Japan . |
| 2244501 | 9/1990 | Japan . |

OTHER PUBLICATIONS

Derwent Abstract of JPA-6 279 667.

*Primary Examiner*—Mark D. Sweet
*Attorney, Agent, or Firm*—Sughrue, Mion, Zinn, Macpeak & Seas

[57] ABSTRACT

A polyphenylene sulfide resin composition excellent in the fluidity and capable of producing a molded article excellent in the surface smoothness and the rigidity is disclosed, which comprises from 40 to 60% by weight of a polyphenylene sulfide resin having a melt viscosity of from 300 to 4000 poises, from 30 to 50% by weight of calcium carbonate having an average particle size of from 1 to 7 μm, and from 8 to 25% by weight of mica having an average particles size of from 1 to 10 μm. The light reflective molded article obtained by molding this composition which is excellent in the surface smoothness and the rigidity is also disclosed.

9 Claims, No Drawings

POLYPHENYLENE SULFIDE RESIN COMPOSITION AND LIGHT REFLECTIVE MOLDED ARTICLE

FIELD OF THE INVENTION

This invention relates to a polyphenylene sulfide resin composition and a light reflective molded article obtained by molding this resin composition. More specifically, the invention relates to a polyphenylene sulfide resin composition excellent in the fluidity and the surface smoothness, the strength and the rigidity of a molded article obtained therefrom, and a light reflective molded article excellent in the surface smoothness, the strength and the rigidity which is obtained by molding this resin composition.

DESCRIPTION OF THE PRIOR ART

Due to their excellent heat resistance, chemical resistance, dimensional stability, and mechanical strength, polyphenylene sulfide resin compositions have been put into application in materials for parts of electric and electronic devices and materials for parts of automobile devices. However, since polyphenylene sulfide resins themselves have an insufficient heat resistance and mechanical strength, they are used by incorporating fibrous reinforcing materials and/or inorganic fillers therein so as to improve their heat resistance and mechanical strength.

As an application of polyphenylene sulfide resins to materials for parts of automobile devices, the utilization thereof as an automobile lamp reflector which requires a high surface smoothness has been suggested. For example, JP-A-63-243162 (the term "JP-A" as used herein means "unexamined published Japanese patent application") discloses a resin composition comprising polyphenylene sulfide resin, about 5 to 40% by weight of an inorganic fiber and about 15 to 70% by weight of silica fume; and JP-A-2-244501 discloses a resin composition comprising a polyphenylene sulfide resin, up to 10% by weight of a glass fiber and 40 to 70% by weight of a filler. However, the composition disclosed in JP-A-63-243162 is insufficient in surface smoothness. Similarly, the composition disclosed in JP-A-2-244501 has a remarkably low surface smoothness due to the addition of the glass fiber. When no glass fiber is added, a molded article produced therefrom undergoes a great deformation at a high temperature because of its low rigidity. Accordingly, when it is used as an automobile lamp reflector, there is a problem in that it causes change in the optical axis of the reflector. Moreover, in the composition disclosed in JP-A-2-244501, there results a remarkable decrease in the surface smoothness of the molded article when a filler having a large particle size is used, while it is impossible to provide a good surface smoothness and rigidity at the same time when a filler is used alone. Thus, these problems cause serious difficulties in the application of these compositions to an automobile lamp reflector.

On the other hand, JP-A-60-189443 discloses an automobile lamp reflector comprising an interlayer sandwiched between a surface layer and a backing layer. However, the interlayer of this reflector comprises a polyamide resin containing a glass fiber and/or a filler, while the surface and the backing layer comprises a polyamide resin.

SUMMARY OF THE INVENTION

The present invention is directed to providing a polyphenylene sulfide resin composition capable of producing a molded article excellent in the surface smoothness, the strength and the rigidity, and a light reflective molded article excellent in the surface smoothness, the strength and the rigidity which is obtained by molding this resin composition.

As a result of an extensive study in order to solve the earlier discussed problems, the present inventors have accomplished the present invention.

Namely, the present invention relates to a polyphenylene sulfide resin composition comprising from 40 to 60% by weight of a polyphenylene sulfide resin having a melt viscosity of from 300 to 4,000 poises, from 30 to 50% by weight of calcium carbonate having an average particle size of from 1 to 7 μm, and from 8 to 25% by weight of mica having an average particles size of from 1 to 10 μm; and a light reflective molded article obtained by molding this resin composition.

DETAILED DESCRIPTION OF THE INVENTION

The present invention will now be described in detail.

The polyphenylene sulfide resins which can be used in the present invention are polyphenylene sulfide resins having a melt viscosity (determined at a determination temperature of 300° C. under a load of 10 kg using a Kōka type flow tester using a die of 1 mm in the diameter and 2 mm in the length) of from 300 to 4,000 poises, preferably from 1,000 to 3,500 poise, and they may be those having a straight chain structure, those cured by a thermal treatment under an oxygen atmosphere or by a thermal treatment in the presence of a peroxide whereby the polymerization degree is increased, or those which are subjected to a thermal treatment under a non-oxidizing inert gas atmosphere, as well as a mixture thereof. Those having a melt viscosity of less than 300 poises tend to decrease in the strength and generate a large amount of a gas. On the other hand, those having the melt viscosity of exceeding 4,000 poises tend to cause a remarkable decrease in the fluidity, which results in a decrease in the surface smoothness of the resulting molded article. A polyphenylene sulfide resin having a melt viscosity of from 1,000 to 3,500 poises is preferred since it provides a particularly excellent fluidity of the resin composition and a particularly excellent strength of the resulting molded article, and it generates only a small amount of a gas.

The polyphenylene sulfide resin described above may be subjected to deionization (acid washing or a hot water washing, etc.) to reduce ions.

The polyphenylene sulfide resin which can be used in the present invention preferably contains at least 70 mol %, more preferably at least 90 mol %, of a constituting unit (p-phenylene sulfide unit) represented by the following formula:

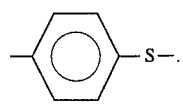

The resin may further contain less than 30 mol %, preferably less than 10 mol %, of a comonomer unit such as an m-phenylene sulfide unit:

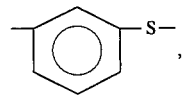

an o-phenylene sulfide unit:

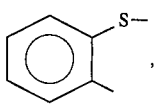

a phenylene sulfide sulfone unit:

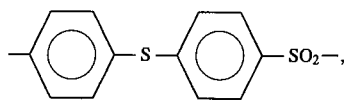

a phenylene sulfide ketone unit:

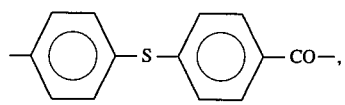

a phenylene sulfide ether unit:

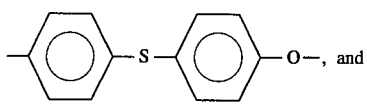

and a diphenylene sulfide unit:

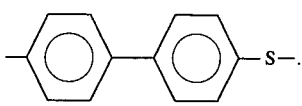

The polyphenylene sulfide resin to be used in the present invention may be prepared by known methods as disclosed, for example, in U.S. Pat. Nos. 3,354,129 and 3,919,177, hereby incorporated by reference.

A preferred example of the polyphenylene sulfide resin to be used in the present invention include, among others, poly(p-phenylene sulfide) resins comprising 100% of the p-phenylene sulfide units.

The amount of the polyphenylene sulfide resin in the resin composition of the present invention is from 40 to 60% by weight, preferably from 40 to 50% by weight, based on the total weight of the composition.

The average particle size ($D_{50}$) of calcium carbonate to be used in the present invention is from 1 to 7 μm, preferably from 2 to 5 μm. Ones having an average particle size exceeding 7 μm are not preferred since the surface smoothness of the resulting molded article tends to decrease. On the other hand, ones having an average particle size of less than 1 μm are not preferred since the fluidity of the resin composition and the strength of the resulting molded article tend to decrease. Calcium carbonate having an average particle size of from 2 to 5 μm is preferred because it provides a particularly superior fluidity of the resin composition and particularly superior surface smoothness and strength of the resulting molded article.

A specific example of the calcium carbonate to be used in the present invention includes ground calcium carbonate.

The amount of calcium carbonate in the resin composition of the present invention is from 30 to 50% by weight, preferably from 33 to 45% by weight, based on the total weight of the composition. If the amount is less than 30% by weight, the heat resistance tends to decrease. On the other hand, if it exceeds 50% by weight, the fluidity of the resin composition and the surface smoothness of the resulting molded article tend to decrease. The amount in the range of from 33 to 45% by weight is preferred because it results in a particularly superior fluidity of the resin composition and particularly superior surface smoothness and heat resistance of the resulting molded article.

The average particle size of mica to be used in the present invention determined by a micro-sieve mesh method is from 1 to 10 μm, preferably from 2 to 8 μm. If the average particle size exceeds 10 μm, the surface smoothness of the resulting molded article tends to decrease. On the other hand, if it is less than 1 μm, the fluidity of the resin composition tends to decrease. Mica having an average particle size of from 2 to 8 μm is preferable because it provides a superior fluidity of the resin composition and a superior surface smoothness of the resulting molded article.

The amount of mica in the resin composition of the present invention is from 8 to 25% by weight, preferably from 10 to 20% by weight, based on the total weight of the composition. If the amount is less than 8% by weight, an effect for improving the rigidity is small. On the other hand, if it exceeds 25% by weight, the surface smoothness of the resulting molded article tends to decrease. The amount in the range of from 10 to 20% by weight is preferable because it results in particular superior surface smoothness and rigidity of the resulting molded article.

The mica to be used in the present invention is preferably pre-treated with a silane or titanium coupling agent so as to improve the strength and fluidity. In particular, an aminosilane coupling agent is preferably used for this purpose since it is effective in improving the strength and fluidity.

According to the present invention, it has been found that a combination of two filler components, i.e., calcium carbonate having an average particle size of from 1 to 7 μm and mica having an average particle size of from 1 to 10 μm, gives a polyphenylene sulfide resin composition excellent in the fluidity and capable of providing a molded article excellent in the heat resistance, the rigidity and the surface smoothness.

The resin composition of the present invention may further contain one or more another filler(s) so long as the effect of the present invention is not impaired. Examples of the filler include talc, barium sulfate, calcium sulfate, kaolin, clay, pyroferrite, bentonite, cerilite, nephelinesycnite, attapulgite, wollastonite, ferrite, calcium silicate, magnesium silicate, dolomite, antimony trioxide, zinc oxide, titanium oxides, magnesium oxide, iron oxides, molybdenum disulfide, graphite, gypsum, glass beads, glass balloons, glass powders, and silica. These fillers may be pre-treated with a titanium or silane coupling agent prior to use.

The resin composition of the present invention may also contain one or more other resins so long as the effect of the present invention is not impaired. Examples of the resin include thermoplastic elastomers such as olefinic, styrene, urethane, ester, fluorine, amide, and acrylic elastomers; rubber materials such as polybutadiene, polyisoprene, polychloroprene, polybutene, styrene-butadiene rubbers and hydrogenated products thereof, acrylonitrile-butadiene rubbers, ethylene-propylene copolymers, and ethylene-propylene-ethylidenenorbornene copolymers; polyamide resins such as nylon 6, nylon 6.6., nylon 4.6., nylon 6.10., nylon 11, and nylon 12; polyester resins such as polyethylene terephthalate, polybutylene terephthalate, and polyacrylates; homopolymers and random, block and graft copolymers of polystyrene, poly(α-methylstyrene), polyvinyl acetate, polyvinyl chloride, polyacrylates, polymethacrylates, polyacrylonitrile, polyurethane, polyacetal, polyphenylene oxide, polycarbonate, polysulfone, polyether sulfone, polyallyl sulfone, polyphenylene sulfide sulfone, polyphenylene sulfide ketone, polyether ketone, polyether ether ketone, polyamideimide, polyimide, silicone resins, phenoxy resins, fluorine resins, and resins capable of melting and which form an anisotropic molten phase; and mixtures and modified products thereof.

In addition, the resin composition of the present invention may contain one or more conventional additive(s) such as mold releasing agents, lubricants, thermal stabilizers, antioxidants, ultraviolet absorbers, crystal nucleating agents, foaming agents, anti-corrosive agents, ion-trapping agents, flame-retardants, flame-retardant aids, colorants such as dyestuffs and pigments, and anti-static agents, so long as the effect of the present invention is not impaired.

The polyphenylene sulfide resin composition of the present invention may be prepared in a conventional manner such as a hot-melt method. An example thereof includes a method in which the components are mixed with a blender such as a V-blender or a Henschel mixer, and the resulting mixture is thermally melted and mixed in a kneader, a mill, or a mono- or twin-screw extruder.

The resulting composition can be molded by using an injection molder, an extrusion molder, a transfer molder, or a compression molder.

The shape of the molded article of the present invention is not particularly limited and it may optionally be selected with reference to those of conventional molded articles as disclosed, for example, in JP-A-2-44501 and JP-A-60-189443.

The molded article obtained by molding the resin composition of the present invention is particularly excellent in the surface smoothness and the rigidity, and thus, it can be used as a light reflective molded article free from the problems described above, such as an automobile lamp reflector excellent in the light reflective performance and firmness of the optical axis.

The present invention will now be described in greater detail by referring to Examples, but the present invention is not restricted to these Examples.

EXAMPLES 1 AND 2

A polyphenylene sulfide resin (PPS, produced by Toso Susteel K. K.; melt viscosity: 1,900 poises), calcium carbonate (average particle size: 4 μm), and mica (average particle size: 5 μm; pre-treated with an aminosilane coupling agent; manufactured by Yamaguchi Unmo Kogyosho) were mixed in a proportion as shown in Table 1, melt-kneaded in a twin-screw extruder at 300° C. and then pelletized. Subsequently, test pieces were produced by means of an injection molder, and subjected to measurement for flexural strength and flexural modulus in accordance with ASTM D-790 to evaluate the strength and the rigidity of the resulting molded articles. In addition, to evaluate the surface smoothness of the resulting molded articles, discs (diameter: 102 mm; thickness: 2 mm) were produced by means of an injection molder and the maximum heights ($R_{max}$) of the specular surfaces of the discs were determined in accordance with JIS B-0601 (the term "JIS" as used herein means "Japanese Industrial Standard"). Further, a fluorescent light was reflected onto each of the specular surface of the discs and the warp of the reflected image was visibly evaluated and rated as "good" (less warp of the reflected image) or "bad" (much warp of the reflected image). Moreover, to evaluate the fluidity, the pellets obtained above were subjected to measurement of a melt flow rate (MFR) in accordance with ASTM D-1238 at a measurement temperature of 315° C. under a load of 5 kg. The results are shown in Table 2.

Molded articles produced from the resin compositions thus obtained were excellent in the strength, the rigidity, and the surface smoothness, thus satisfactory light reflective molded articles were obtained therefrom.

EXAMPLES 3 AND 4

A polyphenylene sulfide resin (PPS, produced by Toso Susteel K. K.; melt viscosity: 1,900 poises), calcium carbonate (average particle size: 4 μm), and mica (average particle size: 5 μm or 6 μm; not pre-treated with any coupling agent; manufactured by Yamaguchi Unmo Kogyosho) were mixed in a proportion as shown in Table 1, and the procedure and evaluations as in Example 1 were carried out. The results are shown in Table 2.

Molded articles produced from the resin compositions thus obtained were excellent in the strength, the rigidity, and the surface smoothness, thus satisfactory light reflective molded articles were obtained.

COMPARATIVE EXAMPLES 1 TO 4

A polyphenylene sulfide resin (PPS, produced by Toso Susteel K. K.; melt viscosity: 1,900 poises), and calcium carbonate having varied average particle sizes and/or mica having varied average particle sizes were mixed in a proportion as shown in Table 1, and the procedure and evaluations as in Example 1 were carried out. The results are shown in Table 2.

Although molded articles produced from the resin composition thus obtained satisfied any of the strength, the rigidity and the surface smoothness, all of these characteristics were not satisfied at the same time, thus, no satisfactory light reflective molded article could be obtained.

COMPARATIVE EXAMPLE 5

A polyphenylene sulfide resin (PPS, produced by Toso Susteel K. K.; melt viscosity: 1,900 poises), calcium carbonate (average particle size: 4 μm), mica (average particle size: 6 μm, not pre-treated with amino coupling agent), and a glass fiber (average fiber diameter: 6.5 μm, 3 mm chopped strand) were mixed in a proportion as shown in Table 1, and the procedure and evaluations as in Example 1 were carried out. The results are shown in Table 2.

Since the resulting resin composition did not give a molded article having a satisfactory surface smoothness, no satisfactory light reflective molded article could be obtained.

COMPARATIVE EXAMPLES 6 AND 7

A polyphenylene sulfide resins (PPS, produced by Toso Susteel K. K.) having varied melt viscosities, calcium carbonate (average particle size: 4 μm), and mica (average particle size: 5 μm, pre-treated with an aminosilane coupling agent) were mixed in a proportion as shown in Table 1, and the procedure and evaluations as in Example 1 were carried out. The results are shown in Table 2.

Although molded articles produced from the resin compositions thus obtained satisfied any of the strength, the rigidity and the surface smoothness, all of these characteristics were not satisfied at the same time, thus, no satisfactory light reflective molded article could be obtained.

TABLE 1

|  | PPS | | Calcium Carbonate | | Mica | | | | |
| --- | --- | --- | --- | --- | --- | --- | --- | --- | --- |
|  | Melt Viscosity (poise) | Amount (wt. %) | Average Particle Size (μm) | Amount (wt. %) | Average Particle Size (μm) | Type of Coupling Agent | Amount (wt %) | Amount of Glass Fiber (wt %) |
| Example 1 | 1900 | 50 | 4 | 34 | 5 | Aminosilane | 16 | — |
| Example 2 | 1900 | 45 | 4 | 43 | 5 | Aminosilane | 12 | — |
| Example 3 | 1900 | 50 | 4 | 34 | 5 | — | 16 | — |
| Example 4 | 1900 | 50 | 4 | 37 | 6 | — | 13 | — |
| Comparative Example 1 | 1900 | 50 | 4 | 50 | — | — | — | — |
| Comparative Example 2 | 1900 | 50 | — | — | 6 | — | 50 | — |
| Comparative Example 3 | 1900 | 50 | 4 | 34 | 20 | — | 16 | — |
| Comparative Example 4 | 1900 | 50 | 10 | 34 | 6 | Aminosilane | 16 | — |
| Comparative Example 5 | 1900 | 50 | 4 | 34 | 6 | — | 11 | 5 |
| Comparative Example 6 | 200 | 50 | 4 | 34 | 5 | Aminosilane | 16 | — |
| Example 7 | 5400 | 50 | 4 | 34 | 5 | Aminosilane | 16 | — |

TABLE 2

| | Characteristics of Molded Articles | | | | |
| --- | --- | --- | --- | --- | --- |
| | Flexural Strength (kg/cm²) | Flexural Modulus (10⁵ kg/cm²) | Surface Smoothness $R_{max}$ (μm) | Surface Smoothness Visible Evaluation | MFR (g/10 min.) |
| Example 1 | 1080 | 1.21 | 0.20 | good | 71 |
| Example 2 | 970 | 1.25 | 0.21 | good | 56 |
| Example 3 | 1040 | 1.23 | 0.21 | good | 61 |
| Example 4 | 980 | 1.18 | 0.21 | good | 60 |
| Comparative Example 1 | 950 | 0.86 | 0.19 | good | 80 |
| Comparative Example 2 | 1390 | 2.23 | 0.26 | bad | — |
| Comparative Example 3 | 1050 | 1.22 | 0.26 | bad | — |
| Comparative Example 4 | 1030 | 1.20 | 0.26 | bad | — |
| Comparative Example 5 | 1250 | 1.22 | 0.25 | bad | — |
| Comparative Example 6 | 820 | 1.20 | 0.20 | good | not determined* |
| Comparative Example 7 | 1120 | 1.21 | 0.27 | bad | 10 |

Note:
*: Not determined because of too high viscosity

As is clear from the description above, a polyphenylene sulfide resin composition capable of producing a molded article excellent in the surface smoothness, the strength and the rigidity is obtained by mixing a polyphenylene sulfide resin having a specified melt viscosity with a specified amount of calcium carbonate having a specified average particle size and a specified amount of mica having a specified average particle size. Further, a light reflective molded article obtained by molding this resin composition is excellent in a light reflective performance and has a firm light axis even at a high temperature.

While the invention has been described in detail and with reference to specific embodiments thereof, it will be apparent to one skilled in the art that various changes and modifications can be made therein without departing from the spirit and scope thereof.

What is claimed is:

1. A polyphenylene sulfide resin composition consisting of from 40 to 60% by weight of a polyphenylene sulfide resin having a melt viscosity of from 300 to 4,000 poises determined at a temperature of 300° C. under a load of 10 kg, from 30 to 50% by weight of calcium carbonate having an average particle size of from 1 to 7 μm, from 8 to 25% by weight of mica having an average particle size of from 1 to 10 μm, and one or more mold releasing agents.

2. The polyphenylene sulfide resin composition of claim 1, wherein said polyphenylene sulfide resin has a melt viscosity of from 1,000 to 3,500 poises.

3. The polyphenylene sulfide resin composition of claim 1, wherein said polyphenylene sulfide resin is a poly(p-phenylene sulfide) resin.

4. The polyphenylene sulfide resin composition of claim 1, wherein said calcium carbonate has an average particle size of from 2 to 5 μm.

5. The polyphenylene sulfide resin composition of claim 1, wherein said calcium carbonate is ground calcium carbonate.

6. The polyphenylene sulfide resin composition of claim 1, wherein said mica has an average particle size of from 2 to 8 μm.

7. The polyphenylene sulfide resin composition of claim 1, wherein said mica is treated with an aminosilane coupling agent.

8. A light reflective molded article obtained by molding a polyphenylene sulfide resin composition of claim 1.

9. The polyphenylene sulfide resin composition of claim 1, wherein said calcium carbonate has an average particle size of from 2 to 5 μm and said mica has an average particle size of from 2 to 8 μm.

* * * * *